United States Patent
Touzni et al.

(10) Patent No.: US 9,170,957 B2
(45) Date of Patent: Oct. 27, 2015

(54) DISTRIBUTED DYNAMIC MEMORY MANAGEMENT UNIT (MMU)-BASED SECURE INTER-PROCESSOR COMMUNICATION

(71) Applicant: Qualcomm Incorporated, San Diego, CA (US)

(72) Inventors: Azzedine Touzni, San Diego, CA (US); Thomas Zeng, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 173 days.

(21) Appl. No.: 14/014,288

(22) Filed: Aug. 29, 2013

(65) Prior Publication Data

US 2015/0067287 A1  Mar. 5, 2015

(51) Int. Cl.
*G06F 12/14* (2006.01)
*G06F 12/10* (2006.01)
*G06F 15/167* (2006.01)
*G06F 21/60* (2013.01)
*G06F 21/79* (2013.01)

(52) U.S. Cl.
CPC ........ *G06F 12/1483* (2013.01); *G06F 12/1009* (2013.01); *G06F 12/1475* (2013.01); *G06F 15/167* (2013.01); *G06F 21/606* (2013.01); *G06F 21/79* (2013.01)

(58) Field of Classification Search
CPC ............ G06F 12/1009; G06F 12/1027; G06F 15/163; G06F 15/167; G06F 21/606; G06F 2212/304; G06F 2213/0038
See application file for complete search history.

(56) References Cited

U.S. PATENT DOCUMENTS

| | | | |
|---|---|---|---|
| 8,001,377 B2 | 8/2011 | Suzuoki et al. | |
| 8,185,748 B2 | 5/2012 | Hatakeyama | |
| 8,220,045 B2 | 7/2012 | Conti et al. | |
| 8,332,931 B1 | 12/2012 | Tran et al. | |
| 8,418,230 B1 | 4/2013 | Cornelius et al. | |
| 2005/0268095 A1* | 12/2005 | O'Connor | 713/167 |
| 2011/0161620 A1* | 6/2011 | Kaminski et al. | 711/207 |
| 2013/0276096 A1* | 10/2013 | Symes et al. | 726/16 |
| 2014/0237609 A1* | 8/2014 | Sharp et al. | 726/26 |
| 2014/0331019 A1* | 11/2014 | Parker et al. | 711/163 |

FOREIGN PATENT DOCUMENTS

EP  2587382 A1  5/2013

OTHER PUBLICATIONS

International Search Report and Written Opinion—PCT/US2014/053568—ISA/EPO—Dec. 2, 2014.

* cited by examiner

*Primary Examiner* — Hal Schnee
(74) *Attorney, Agent, or Firm* — Smith Risley Tempel Santos LLC

(57) ABSTRACT

A first processor and a second processor are configured to communicate secure inter-processor communications (IPCs) with each other. The first processor effects secure IPCs and non-secure IPCs using a first memory management unit (MMU) to route the secure and non-secure IPCs via a memory system. The first MMU accesses a first page table stored in the memory system to route the secure IPCs and accesses a second page table stored in the memory system to route the non-secure IPCs. The second processor effects at least secure IPCs using a second MMU to route the secure IPCs via the memory system. The second MMU accesses the second page table to route the secure IPCs.

29 Claims, 7 Drawing Sheets

DISTRIBUTED DYNAMIC MEMORY MANAGEMENT UNIT (MMU)-BASED SECURE INTER-PROCESSOR COMMUNICATION

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

A system-on-a-chip ("SOC") in a PCD is an integrated ASIC that can embed multiple central processing units ("CPUs"), digital signal processors ("DSPs"), and various hardware ("HW") functions for process acceleration and/or input/output ("I/O") device communication. SOCs with multiple DSPs or CPUs typically require embedded inter-processor communication ("IPC"). Secure IPC between a source and a destination in an embedded SOC may be required in some situations. For example, in an SOC that has more than two CPUs, two HW sub-systems with their own respective CPUs may need to communicate securely. A simple threat model for secure IPC includes preventing any third party software ("SW") internally running in the SOC (including from other embedded CPUs) from accessing messages and data intended to be used exclusively by the producer and the consumer of the information.

A typical solution for secure IPC is to employ some form or encryption between a source and a destination. Although this may be the only option for physically separated entities, using encryption in embedded systems may add a prohibitive overhead. Contributors to such overhead can be grouped into three main categories: (a) management of secure keys (which come with some SW complexity and potential manufacturing cost overhead for one-time password (OTP) key management); (b) bandwidth reduction due to packet size increase; and (c) additional SW complexity and throughput reduction.

Modern computer systems use memory management units ("MMUs") to manage writing data to and reading data from one or more physical memory devices. An MMU of a computer system provides a virtual memory to the CPU of the computer system that allows the CPU to run each software program in its own dedicated, contiguous virtual memory address space rather than having all of the application programs share the physical memory address space, which is often fragmented, or non-contiguous. The purpose of the MMU is to translate virtual memory addresses ("VAs") into physical memory addresses ("PAs") for the CPU. The CPU indirectly reads and writes PAs by directly reading and writing VAs to the MMU, which translates them into PAs and then writes or reads the PAs. Employing MMUs in a PCD may provide advantages, such as enabling a CPU to run two different operating systems, such as LINUX and ANDROID, each running in its own virtual memory space.

In order to perform the translations, the MMU accesses page tables stored in the system main memory. The page tables comprise page table entries. The page table entries represent information that is used by the MMU to map the VAs into PAs.

SUMMARY OF THE DISCLOSURE

Embodiments of methods, systems and computer program products for providing secure inter-processor communication on an integrated circuit chip are disclosed. In an exemplary embodiment, a system for providing secure inter-processor communication on an integrated circuit chip comprises a memory system and at least a first processor and a second processor. A processor may be, for example, a central processing unit or a digital signal processor. The first processor is configured to effect secure inter-processor communications and non-secure inter-processor communications using a first memory management unit to route the secure inter-processor communications and non-secure inter-processor communications via the memory system. The first memory management unit is configured to access a first page table stored in the memory system to route the secure inter-processor communications and configured to access a second page table stored in the memory system to route the non-secure inter-processor communications. The second processor is configured to effect at least secure inter-processor communications using a second memory management unit to route the secure inter-processor communications via the memory system. The second memory management unit is configured to access the second page table stored in the memory system to route the secure inter-processor communications.

In the exemplary embodiment, a method for providing secure inter-processor communication on an integrated circuit chip comprises a first processor and a second processor communicating secure inter-processor communications with each other. The first processor effects secure inter-processor communications and non-secure inter-processor communications using a first memory management unit to route the secure inter-processor communications and non-secure inter-processor communications via a memory system. The first memory management unit accesses a first page table stored in the memory system to route the secure inter-processor communications and accesses a second page table stored in the memory system to route the non-secure inter-processor communications. The second processor effects at least secure inter-processor communications using a second memory management unit to route the secure inter-processor communications via the memory system. The second memory management unit accesses the second page table stored in the memory system to route the secure inter-processor communications.

In the exemplary embodiment, an integrated circuit comprises means for a first processor and a second processor to communicate secure inter-processor communications with each other. The means for the first processor and second processor to communicate secure inter-processor communications with each other comprises means for the first processor to effect secure inter-processor communications and non-secure inter-processor communications using a first memory management unit to route the secure inter-processor communications and non-secure inter-processor communications via a memory system. The first memory management unit accesses a first page table stored in the memory system to route the secure inter-processor communications and accessing a second page table stored in the memory system to route the non-secure inter-processor communications. The means for the first processor and second processor to communicate secure inter-processor communications with each other further comprises means for the second processor to effect secure inter-processor communications using a second memory management unit to route the secure inter-processor communications via the memory system. The second memory management unit accesses the second page table stored in the memory system to route the secure inter-processor communications.

In the exemplary embodiment, a computer program product comprises a non-transitory computer readable medium having computer readable program code embodied therein.

The computer readable program code comprises first logic and second logic. The first logic configures a first processor to effect secure inter-processor communications and non-secure inter-processor communications using a first memory management unit to route the secure inter-processor communications and non-secure inter-processor communications via the memory system. The first memory management unit is configured to access a first page table stored in the memory system to route the secure inter-processor communications and configured to access a second page table stored in the memory system to route the non-secure inter-processor communications. The second logic configures a second processor to effect at least secure inter-processor communications using a second memory management unit to route the secure inter-processor communications and non-secure inter-processor communications via the memory system. The second memory management unit is configured to access the second page table stored in the memory system to route the secure inter-processor communications.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

In this description, the term "portable computing device" ("PCD") is used to describe any computing device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a personal digital assistant or PDA, a smartphone, a navigation device, a smartbook or reader, a media player, a combination of the aforementioned devices, or a laptop computer with a wireless connection, among others.

In this description, the term "application" or "application program" may include files having executable content, such as object code, scripts, byte code, markup language files, and patches. In addition, an "application" or "application program" referred to herein may also include files that are not executable in nature, such as documents that may need to be opened or other data files that need to be accessed.

As used in this description, the terms "component," "database," "module," "system," "processing component," "multimedia processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various logic or data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
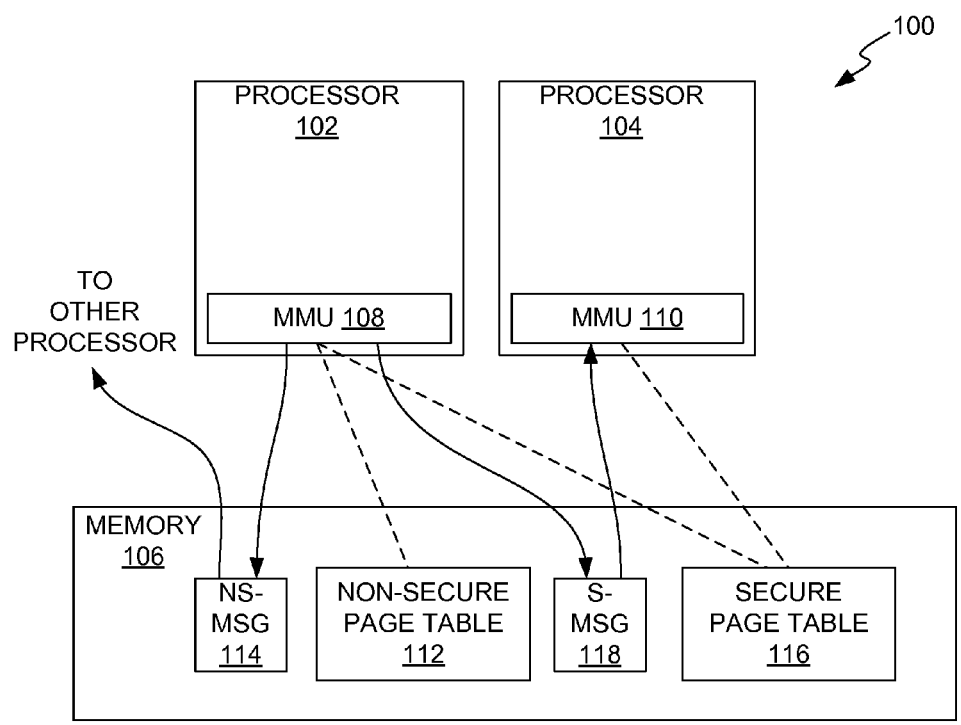
FIG. 1 is a block diagram illustrating an exemplary embodiment of a system for providing secure inter-processor communication.

As illustrated in FIG. 1, an exemplary computing system 100 on an integrated circuit chip (i.e., a so-called "system-on-a-chip" or "SOC") includes a first processor 102, a second processor 104, and a memory system 106. At least one of first and second processors 102 and 104 may be the type of processor commonly referred to as a central processing unit ("CPU"). The other of first and second processors 102 and 104 also may be a CPU, or it may be any other suitable type of processor, such as a digital signal processor ("DSP") or another type of device that processes information at least in part under software or firmware control, such as a PCIe interface. In accordance with conventional computing principles, first and second processors 102 and 104 operate under the control of software code, such as operating system code and application program code (not shown), which may be stored in memory system 106 or other memory (not shown).

First processor 102 includes a first memory management unit ("MMU") 108, and second processor 104 includes a second MMU 110. Although MMUs 108 and 110 are commonly implemented as hardware elements, alternatively, they can be implemented as software or firmware, i.e., logic that configures the respective processors 102 and 104 to perform the functions described herein. It should be noted that the combination of one or more software logic elements and the memory or other medium in which they are stored constitutes what is referred to in the patent lexicon as a "computer program product."

As understood by one of ordinary skill in the art, MMUs 108 and 110 manage writing data to and reading data from memory system 106. The MMUs 108 and 110 provide their respective processors 102 and 104 with respective virtual memory spaces that allow each of processors 102 and 104 to run applications or other software in its own dedicated, contiguous virtual memory address space. Each of MMUs 108 and 110 translates between virtual memory addresses ("VAs") and physical memory addresses ("PAs") for its respective processor 102 and 104. As understood by one of ordinary skill in the art, in order to perform the translations, an MMU accesses page tables stored in memory system 106.

In the example shown in FIG. 1, MMU 108 points to or uses (indicated by broken line) a non-secure page table 112 as part of the process for transmitting or receiving a non-secure inter-processor communication ("IPC"), such as the exemplary non-secure message 114, but uses a secure page table 116 as part of the process for transmitting or receiving a secure IPC, such as the exemplary secure message 118. As used herein, the term "inter-processor communication" or "IPC" refers to a message or communication sent from one of processors 102 and 104 to the other or to still another such processor (not shown). Such messages are routed via memory system 106. That is, at some point during the process of conveying a message from one processor to another, the message or a portion thereof is stored in memory system 106. Thus, in the example shown in FIG. 1, first MMU 108 configures first processor 102 to use secure page table 116 in memory system 106 to route secure message 118 to second processor 104 via memory system 106. Correspondingly, MMU 110 configures second processor 104 to use that same secure page table 116 to route or accept secure message 118 from memory system 106. In other words, the sharing of secure page table 116 by MMUs 108 and 110 enables them to communicate secure messages. The memory segmentation and isolation properties of MMUs 108 and 110 maintain the security of messages managed using the shared secure page table 116. As such properties are understood by one of ordinary skill in the art, they are not described in further detail herein. Similarly, with the exception of this security feature, the general manner in which a processor communicates a message to another processor in an SOC is understood by one of ordinary skill in the art. Therefore, such general or conventional aspects of inter-processor communication in SOC 100 are not described in further detail herein. In the example shown in FIG. 1, first MMU 108 also configures first processor 102 to use non-secure page table 112 in memory system 106 to route non-secure message 114 to yet another processor (not shown) via memory system 106. First MMU 108 prevents first processor 102 from using secure page table 116 to route non-secure messages. Although page tables 112 and 116 are shown in FIG. 1 as stored in or residing in memory system 106, it should be understood that processors 102 and 104 may retrieve and store portions of them internally.

Figure 7:
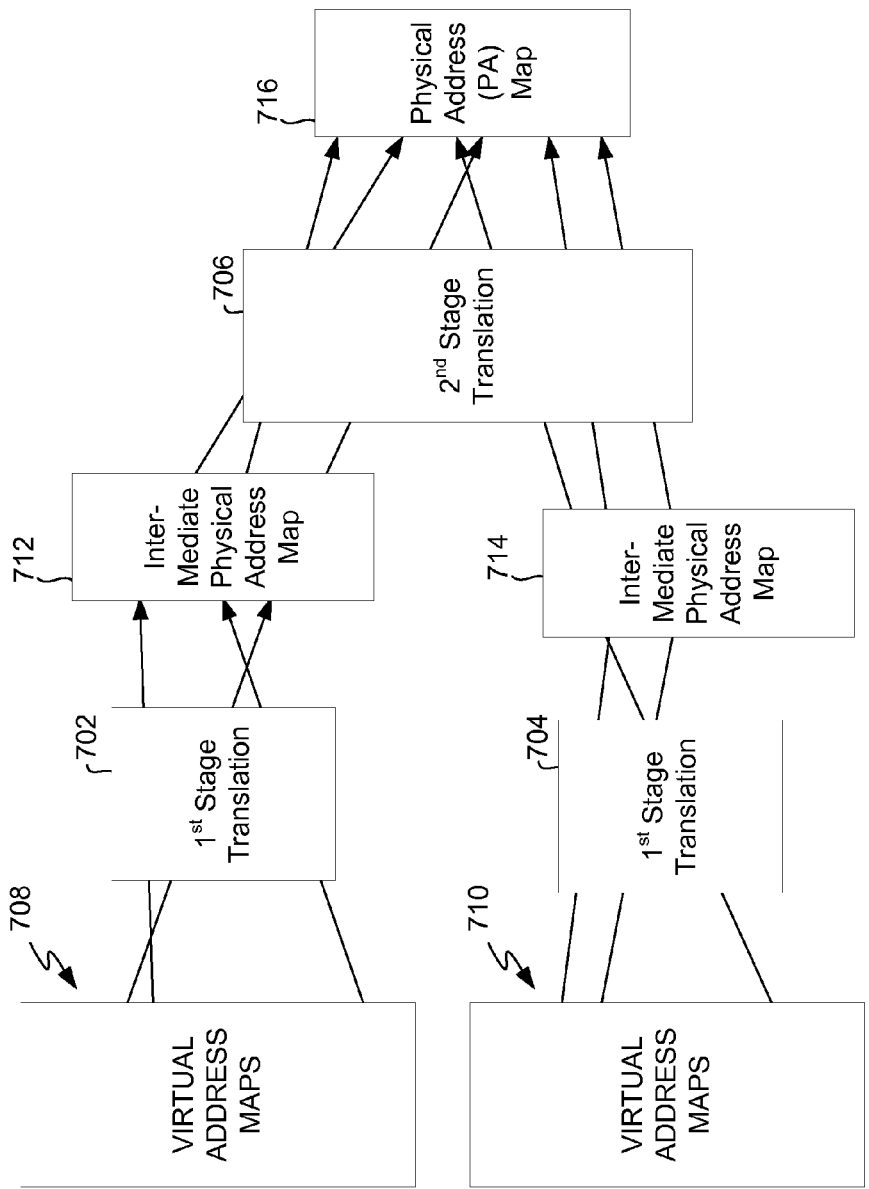
FIG. 7 is a diagram illustrating translation of virtual addresses into physical addresses.

An example of how an MMU may translate VAs into PAs is conceptually illustrated in FIG. 7. The translations are performed in two stages. In this example, two first-stage translations 702 and 704 and one second-stage translation 706 are shown. Translations 702, 704 and 706 are based upon a page table (not shown in FIG. 7). Each of one or more virtual address maps 708 corresponds to a thread of execution on a processor. Similarly, each of one or more virtual address maps 710 corresponds to a thread of execution on a processor, which may be the same or a different processor from that on which threads corresponding to virtual address maps 708 execute. The sub-blocks within each of virtual address maps 708 represent blocks of addresses. The arrows represent address translations. With respect to an exemplary one virtual address maps 708, the MMU uses the page table to translate the virtual address map 708 into an intermediate physical address map 712. Similarly, with respect to an exemplary one of virtual address maps 710, the MMU uses the page table to translate the virtual address map 710 into another intermediate physical address map 714. The MMU then uses the page table to translate the intermediate physical address maps 712 and 714 into a physical address (PA) map 716.

Figure 2:
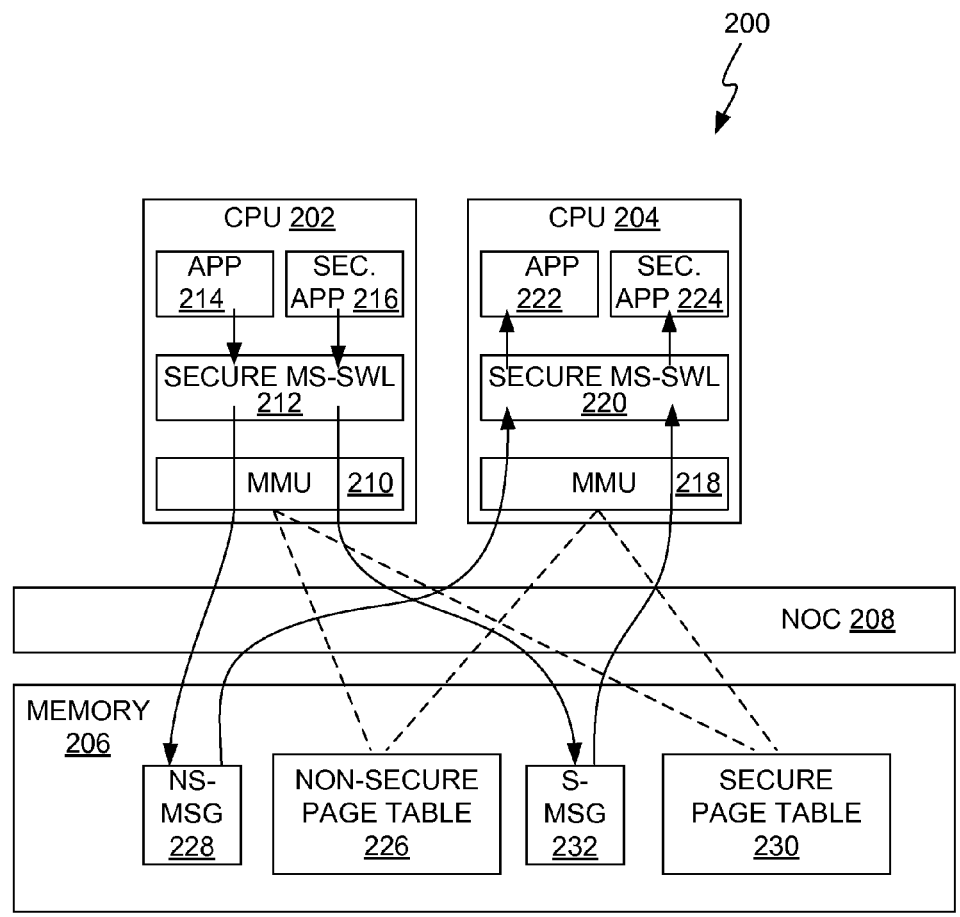
FIG. 2 is a block diagram illustrating another exemplary embodiment of a system for providing secure inter-processor communication.

As illustrated in FIG. 2, an exemplary computing system 200 on an integrated circuit chip (i.e., an SOC) includes a first CPU 202, a second CPU 204, and a memory system 206. A network-on-chip ("NOC") 208 serves as a means for routing secure and non-secure IPCs or messages between CPUs 202 and 204 via memory system 206. The NOC 208 essentially comprises one or more buses, as understood by one of ordinary skill in the art.

First CPU 202 operates under the control of software code that may include a first MMU 210, a first secure memory segmentation software layer ("MS-SWL") 212, a first (non-secure) application program 214, and a first secure application program 216. An example of a secure application program that may need to communicate secure messages with other processors is a Digital Rights Management ("DRM") application. The MMU 210 and MS-SWL 212 function as software layers or interfaces between the functionality of application programs 214 and 216 and memory system 206. The MS-SWL 212 may operate in a privileged or exception-level mode, which one of ordinary skill in the art understands refers to the restriction of access to a limited subset of registers in CPU 202 by an application program having a privilege level corresponding to that subset. It should be understood that a reference in this description to an application program performing an action is for purposes of clarity or brevity, and that in actuality it is the CPU operating under control of the application program that performs the action. The MS-SWL 212 thus performs a function of filtering access to higher software layers by incoming IPC, such as access to secure application program 216.

Similarly, second CPU 204 operates under the control of software code that may include a second MMU 218, a second MS-SWL 220, a second (non-secure) application program 222, and a second secure application program 224. The MMU 210 and MS-SWL 220 function as software layers or interfaces between application programs 214 and 216 and memory system 206.

In the example shown in FIG. 2, MMU 202 uses a non-secure page table 226 as part of the process for transmitting or receiving a non-secure IPC, such as the exemplary non-secure message 228, but uses a secure page table 230 as part of the process for transmitting or receiving a secure IPC, such as the exemplary secure message 232. Messages 228 and 232 are routed via memory system 206. Thus, in the example shown in FIG. 2, first MMU 210 configures first CPU 202 to use secure page table 230 in memory system 206 to route secure message 232 to second CPU 204 via memory system 206. Correspondingly, MMU 218 configures second CPU 204 to use that same secure page table 230 to receive or accept secure message 232 from memory system 206. In other words, the sharing of secure page table 230 by MMUs 210 and 218 enables them to communicate secure messages. The memory segmentation and isolation properties of MMUs 210 and 218 maintain the security of messages managed using the shared secure page table 230. In the example shown in FIG. 2, MMU 210 also configures CPU 202 to use non-secure page table 226 in memory system 206 to route non-secure message 228 to second CPU 204 via memory system 206. The memory segmentation and isolation properties of MMU 210 prevent CPU 202 from using secure page table 230 to produce or route non-secure messages and prevent CPU 202 from using non-secure page table 226 to produce or route secure messages. Likewise, the memory segmentation and isolation properties of MMU 210 prevent CPU 204 from using secure page table 230 to access or "consume" (i.e., use as input) non-secure messages and prevent CPU 204 from using non-secure page table 226 to access or consume secure messages.

Figure 3:
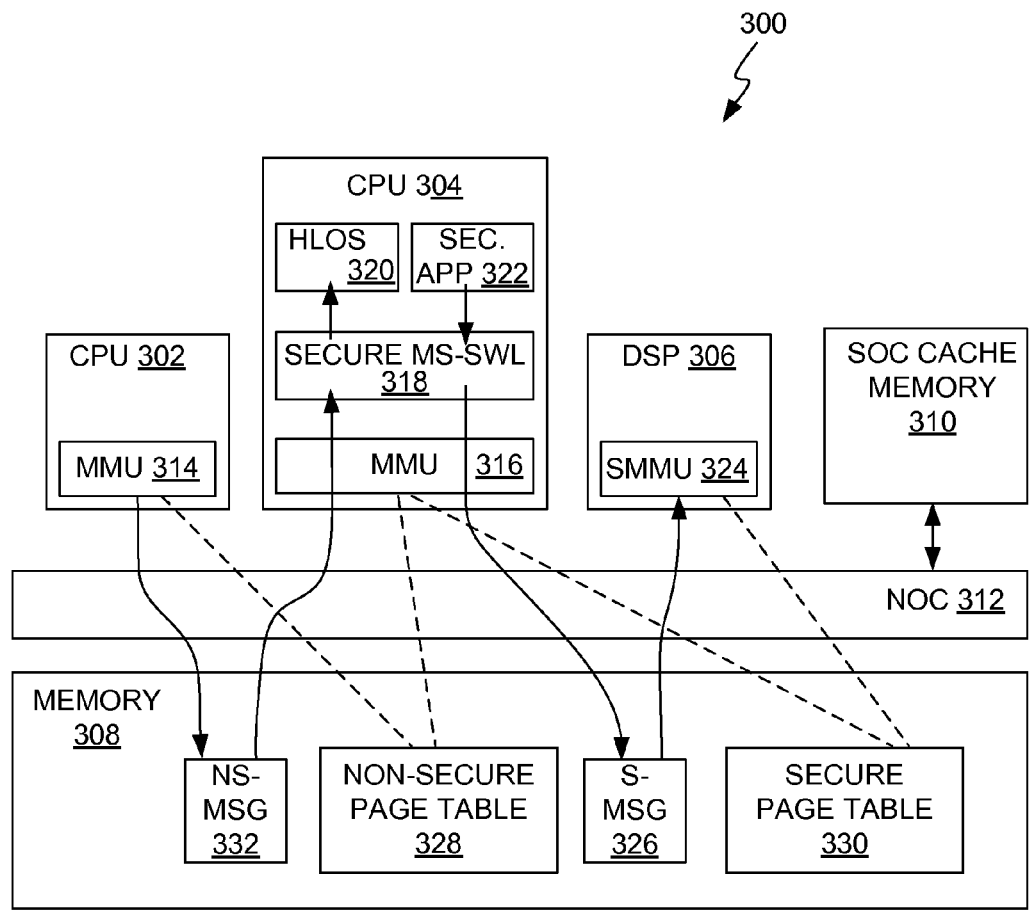
FIG. 3 is a block diagram illustrating still another exemplary embodiment of a system for providing secure inter-processor communication.

As illustrated in FIG. 3, an exemplary computing system 300 on an integrated circuit chip (i.e., an SOC) includes a first CPU 302, a second CPU 304, a DSP 306, a memory system 308, and a cache memory 310. An NOC 312 serves as a means for routing secure and non-secure IPCs or messages among CPU 302, CPU 304 and DSP 306 via memory system 308 or cache memory 310. Although messages and software elements are shown for purposes of clarity in FIG. 3 as being routed via memory system 308, alternatively, some or all may be routed via cache memory 310.

First CPU 302 operates under the control of software code that may include a first MMU 314 (other software elements are not shown for purposes of clarity). Second CPU 304 operates under the control of software code that may include a second MMU 316, an MS-SWL 318, a high-level operating system kernel ("HLOS") 320, and a secure application program 322. In this example, CPU 304 may be a general-purpose CPU that controls the overall or high-level operation of SOC 300, while CPU 302 controls a more specific function within SOC 300, and DSP 306 controls a function such as processing confidential data captured by sensors (not shown) external to SOC 300. It should be noted that MS-SWL 318 runs in a mode that prevents HLOS 320 from corrupting the IPC feature of MS-SWL 318. The execution mode could consist of a separate CPU exception regime providing access to authorized hardware resources existing in SOC 300. Additionally, the IPC software of MS-SWL 318 may be signed and then authenticated prior to execution. The IPC software may be encrypted and then decrypted at boot time, using private and public keys embedded in SOC 300.

The DSP 306 operates in part under control of a system secure memory management unit ("SMMU") 324. An SMMU is similar to an MMU but is generally associated with a hardware element that processes information in a more specific manner than a CPU. An example of such a hardware element is an input/output ("I/O") device controller, such as a PCIe interface or a SATA drive.

In the example shown in FIG. 3, MMU 314 prevents CPU 302 from accessing secure IPC, such as secure message 326, which is communicated between CPU 304 and DSP 306, because MMU 314 is restricted to using the non-secure page table 328 and restricted from using the secure page table 330. However, CPU 302 and CPU 304 are capable of communicating non-secure IPC, such as non-secure message 332, with each other because their respective MMUs 314 and 316 share non-secure page table 328. In addition, CPU 304 and DSP 306 are capable of communicating secure IPC, such as secure message 326, with each other because MMU 316 and SMMU 324 share secure page table 330. Note that this configuration effectively defines a secure point-to-point (i.e., processor-to-processor) communication channel between CPU 304 and DSP 306.

Also, in the example shown in FIG. 3, MS-SWL 318 can securely provide configuration information to DSP 306 and any other DSPs or other such processors that require secure configuration information. Such configuration information received by DSP 306 is used to configure SMMU 324.

Figure 4:
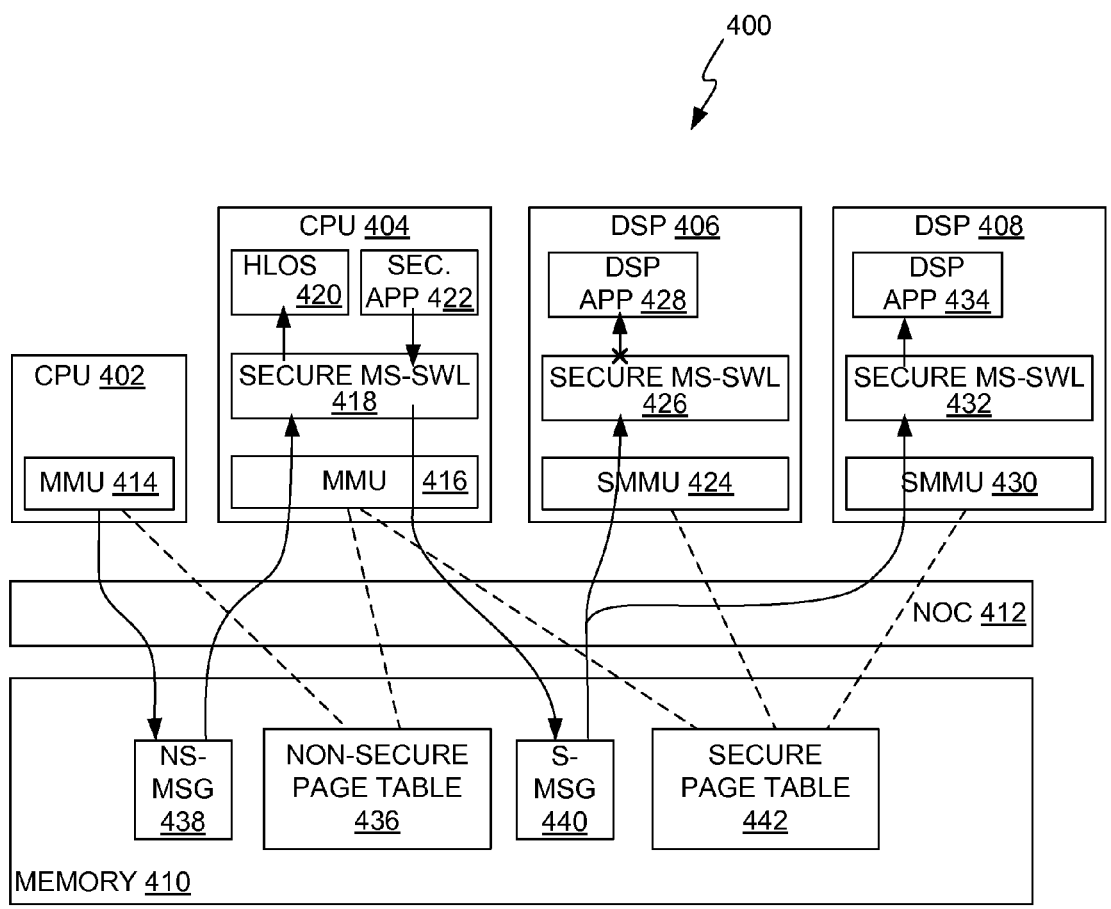
FIG. 4 is a block diagram illustrating yet another exemplary embodiment of a system for providing secure inter-processor communication.

As illustrated in FIG. 4, an exemplary computing system 400 on an integrated circuit chip (i.e., an SOC) includes a first CPU 402, a second CPU 404, a first DSP 406, a second DSP 408, and a memory system 410. An NOC 412 serves as a means for routing secure and non-secure IPCs or messages among CPU 402, CPU 404, DSP 406 and DSP 408 via memory system 410.

First CPU 402 operates under the control of software code that may include a first MMU 414 (other software elements are not shown for purposes of clarity). Second CPU 404 operates under the control of software code that may include a second MMU 416, an MS-SWL 418, an HLOS 420, and a secure application program 422. In this example, CPU 404 may be a general-purpose CPU that controls the overall or high-level operation of SOC 400, while CPU 402 controls a more specific function within SOC 400, and DSPs 406 and 408 control functions such as processing confidential data captured by sensors (not shown) external to SOC 400. It should be noted that MS-SWL 418 runs in a mode that prevents HLOS 420 from corrupting the IPC feature of MS-SWL 418. The execution mode could consist of a separate CPU exception regime providing access to authorized hardware resources existing in SOC 400. Additionally, the IPC software of MS-SWL 418 may be signed and then authenticated prior to execution. The IPC software may be encrypted and then decrypted at boot time, using private and public keys embedded in SOC 400.

First DSP 406 operates under the control of software code that may include an SMMU 424, an MS-SWL 426, and a secure DSP application program 428. Second DSP 408 operates under the control of software code that may include an SMMU 430, an MS-SWL 432, and a secure DSP application program 434.

In the example shown in FIG. 4, CPUs 402 and 404 are capable of communicating non-secure IPC with each other in the same manner described above with regard to CPUs 302 and 304 in FIG. 3. That is, their respective MMUs 414 and 416 share a non-secure page table 436 to communicate a non-secure message 438. In addition, in this example CPU 404 is configured by means of MMU 416 to broadcast a secure message 440 over NOC 412 in a network-like manner. With regard to DSP 406, SMMU 424 receives secure message 440 via NOC 412 because SMMU 424 shares a secure page table 442 with MMU 416, but MS-SWL 426 is configured to act as a filter to block secure message 440 from being consumed by secure DSP application program 428 or any other higher-level software elements (not shown) associated with the operation of DSP 406. (In FIG. 4 the "x" symbol in the arrow from MS-SWL 426 to DSP application program 428 represents filtering or blocking.) In this manner, only a processor that is an intended recipient of the secure message will be able to consume it. With regard to DSP 408, SMMU 430 receives secure message 440 via NOC 412 because SMMU 430 shares secure page table 442 with MMU 416, and MS-SWL 432 is configured to pass (i.e., selectively filter) secure message 440 so that it can be consumed by secure DSP application program 434. In this example, DSP 408 is an intended recipient of secure message 440.

Figure 5:
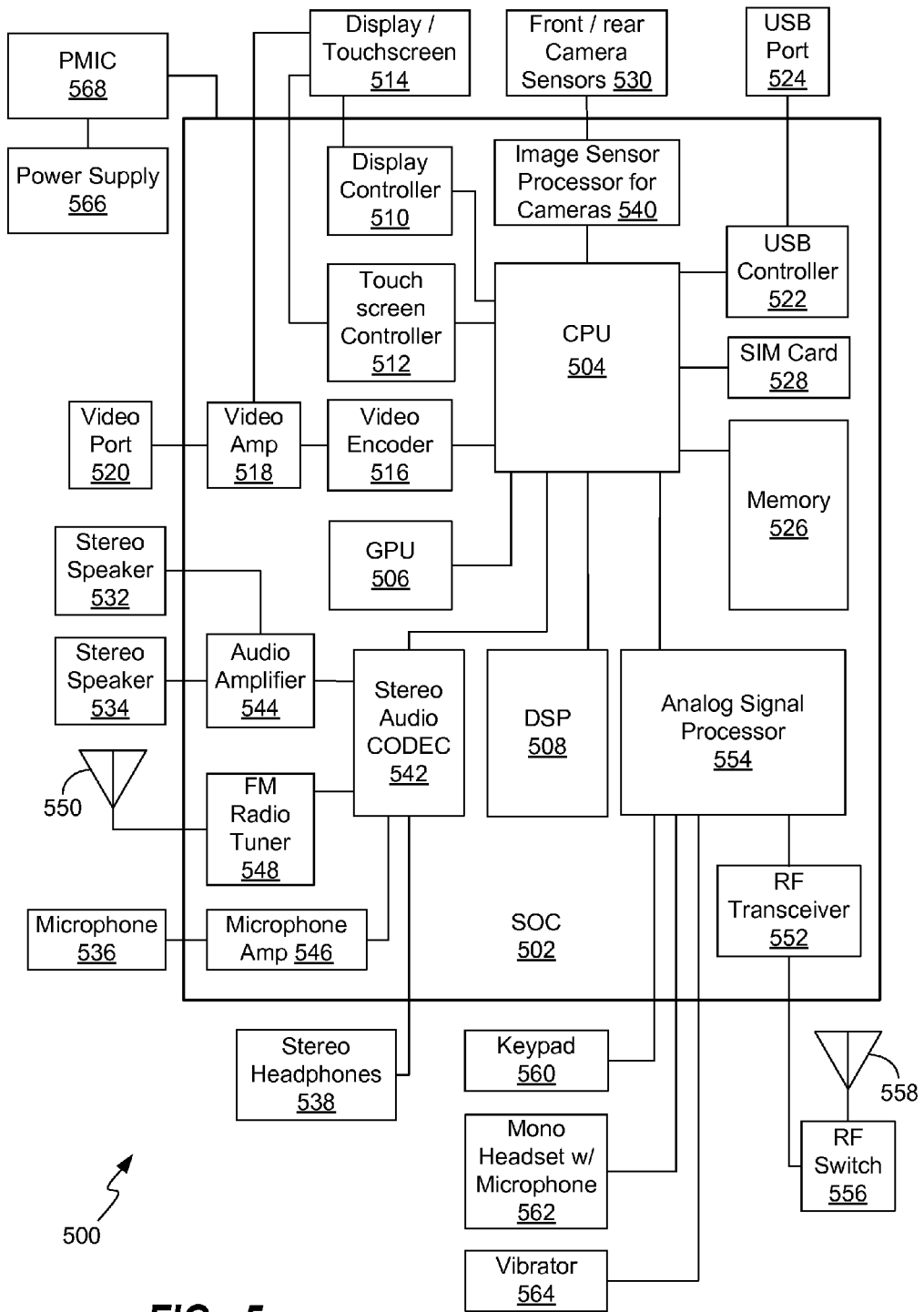
FIG. 5 is a block diagram of a portable computing device having secure inter-processor communication.

As illustrated in FIG. 5, a portable computing device 500 includes a system-on-a-chip (SOC) 502. The SOC 502 may be an ASIC or other integrated circuit. The SOC 502 includes one or more CPUs 504, one or more graphics processing units ("GPUs") 506, and one or more DSPs 508. Any of the foregoing processors may embody the processors described above with regard to FIGS. 1-4 and accordingly may operate in part under control of the above-described software elements, such as an MMU/SMMU, MS-SWL and application programs. The processors and other devices shown FIG. 5 may be interconnected via an NOC, although the NOC is not shown in FIG. 5 for purposes of clarity.

A display controller 510 and a touch screen controller 512 are coupled to CPU 504. A touch screen display 514 external to SOC 502 is coupled to display controller 510 and touch screen controller 512. The PCD 500 may further include a video encoder 516, e.g., a phase-alternating line ("PAL") encoder, a Sequential Couleur Avec Memoire ("SECAM") encoder, a National Television System(s) Committee ("NTSC") encoder, coupled to CPU 504. A video amplifier 518 is coupled to video encoder 516 and touch screen display 514. A video port 520 is coupled to video amplifier 518. A universal serial bus ("USB") controller 522 is coupled to CPU 504, and a USB port 524 is in turn coupled to USB controller 522.

A memory 526 is coupled to CPU 504. Memory 526 may embody any of the memory systems described above with regard to FIGS. 1-4.

Further devices or elements that are coupled to CPU 504 include a subscriber identity module ("SIM") card 528, front/rear digital camera (image) sensors 530, stereo speakers 532 and 534, a microphone 536, and stereo headphones 538. An image sensor processor 540 may couple front/rear camera sensors 530 to CPU 504. A stereo audio CODEC 542 and an audio amplifier 544 may couple stereo speakers 532 and 534 to CPU 504. Stereo audio CODEC 542 and a microphone amplifier 546 may couple microphone 536 to CPU 504. A frequency modulation ("FM") radio tuner 548 and an FM antenna 550 also may be coupled to stereo audio CODEC 542.

A radio frequency ("RF") transceiver 552 may be coupled to an analog signal processor 554. An RF switch 556 may be coupled to the RF transceiver 552 and an RF antenna 558. A keypad 560, a mono headset with a microphone 562, and a vibrator device 564 may be coupled to CPU 504 via the analog signal processor 554.

A power supply 566, such as a battery system, may be coupled SOC 502 through a power management integrated circuit ("PMIC") 568. Power supply 566 includes a rechargeable DC battery or a DC power supply that is derived from an alternating current ("AC") to DC transformer that is connected to an AC power source (not shown).

Note that touch screen display 514, video port 520, USB port 524, front/rear camera sensors 530, stereo speakers 532 and 534, microphone 536, FM antenna 550, stereo headphones 538, RF switch 556, RF antenna 558, keypad 560, mono headset 562, vibrator 564, power supply 566, and PMIC 568 are external to SOC 502. The system, method, integrated circuit, and computer-readable medium described in this specification provide secure communication among processors on SOC 502.

It should be noted that the combination of one or more of the software elements described above with regard to FIGS. 1-4 and memory 526 (FIG. 5) or any other such non-transitory computer-readable medium constitutes a "computer program product" as that term is understood in the patent lexicon. More generally, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

A computer-readable medium can be, for example, an electronic, magnetic, optical, electromagnetic, infrared, or semiconductor system, apparatus or device, including but not limited to the following (non-exhaustive list): a random-access memory ("RAM"), a read-only memory ("ROM"), an electrically erasable programmable read-only memory ("EE-PROM"), a FLASH memory module, a magnetic disk, an optical medium such as a compact disc read-only memory (CDROM), and a Blu-ray disc.

More specifically, and with reference to FIGS. 1-4, a first MMU or, alternatively, a first MMU in combination with a first MS-SWL, stored in a computer-readable medium may define first logic that configures a first processor to effect secure and non-secure IPCs by using the first MMU to route the secure and non-secure IPCs via a memory system. Similarly, an MMU or, alternatively, an MMU in combination with an MS-SWL, stored in a computer-readable medium may define second logic that configures a second processor to effect at least secure (and, in some embodiments, non-secure) IPCs by using the second MMU to route at least the secure IPCs via the memory system.

Figure 6:
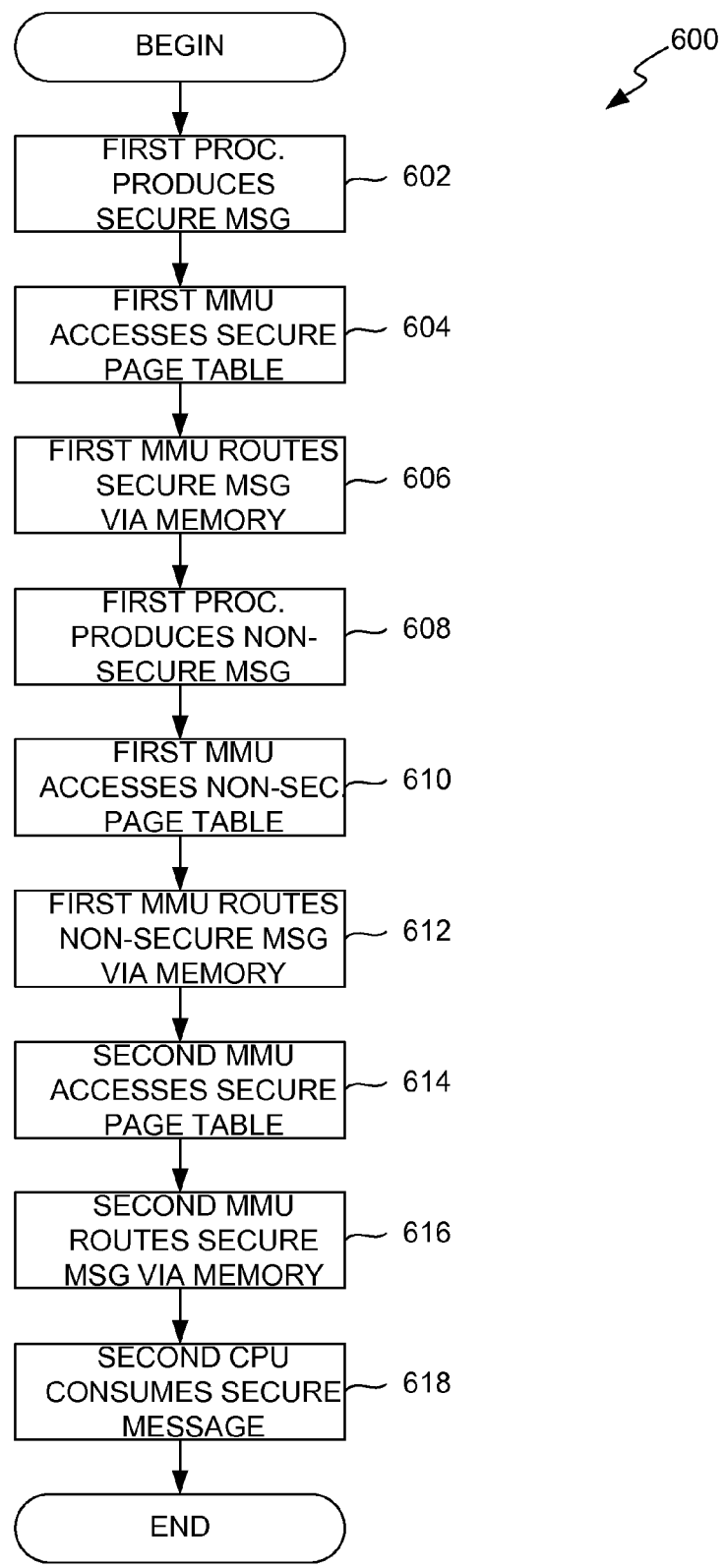
FIG. 6 is a flow diagram illustrating an exemplary embodiment of a method for providing secure inter-processor communication.

An exemplary embodiment of a method for providing secure IPC is illustrated by the flow diagram 600 of FIG. 6. Certain steps or actions described with regard to FIG. 6 naturally precede others for the method to function as described. However, the invention is not limited to the order of the steps described if such order or sequence does not alter the functionality of the invention. That is, it is recognized that some steps may performed before, after, or in parallel (effectively simultaneously) with other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

As indicated by block 602, a first processor produces or initiates a secure message. In other words, for example, an application program or high-level operating system executing on the processor may initiate the secure message. The first processor may be, for example, a CPU. As indicated by block 604, a first MMU executing on the first processor points to or otherwise accesses a secure page table in memory. As indicated by block 606, the first MMU routes the secure message via a memory.

As indicated by block 608, the first processor may also produce or initiate a non-secure message. In other words, for example, an application program or high-level operating system executing on the processor may initiate the non-secure message. As indicated by block 610, the first MMU points to or otherwise accesses a non-secure page table in memory. As indicated by block 612, the first MMU routes the non-secure message via a memory.

A second processor receives and consumes at least the secure message but may also receive and consume the non-secure message, or still another processor may receive and consume the non-secure message. The second processor may be, for example, a CPU or a DSP or other processor that consumes secure IPC. As indicated by block 614, a second MMU executing on the second processor points to or otherwise accesses the secure page table in memory. As indicated by block 616, the second MMU routes the secure message from the memory to the second processor. Consequently, an application program executing on the second CPU may consume the received secure message.

One of ordinary skill in programming is able to write computer code or identify appropriate hardware and/or circuits to implement the disclosed invention without difficulty based on flow diagram 600 and associated description in this specification. Therefore, disclosure of a particular set of program code instructions or detailed hardware devices is not considered necessary for an adequate understanding of how to make and use the invention. The inventive functionality of the claimed computer-implemented method is explained in more detail in the above description and in conjunction with the drawings, which may illustrate various process flows.

Therefore, although selected aspects have been illustrated and described in detail, it will be understood that various substitutions and alterations may be made therein without departing from the spirit and scope of the present invention, as defined by the following claims.

What is claimed is:

1. A system for providing security in inter-processor communication on an integrated circuit chip, the system comprising:
   a shared memory system;
   a first processor in communication with the shared memory system, the first processor configured to effect secure inter-processor communications and non-secure inter-processor communications using a first memory management unit to separately route the secure inter-processor communications and the non-secure inter-processor communications via the shared memory system, the first memory management unit configured to access a first secure page table stored in the shared memory system to route the secure inter-processor communications and access a separate second non-secure page table stored in the shared memory system to route the non-secure inter-processor communications; and
   a second processor in communication with the shared memory system, the second processor configured to effect at least secure inter-processor communications using a second memory management unit to route the secure inter-processor communications via the shared memory system, the second memory management unit configured to access the first secure page table stored in the shared memory system to route the secure inter-processor communications, wherein the first processor executes a first secure memory segmentation software layer, a non-secure application program, and a secure application program, non-secure inter-processor communications issued by the non-secure application program being routed to the first memory management unit via the first secure memory segmentation software layer, secure inter-processor communications associated with the secure application program being routed between the secure application program and the first memory management unit via the first secure memory segmentation software layer.

2. The system of claim 1, wherein the second processor executes a second secure memory segmentation software layer.

3. The system of claim 1, wherein:
   the first processor is a central processing unit; and
   the second processor is a central processing unit, the second memory management unit being further configured to access the separate second non-secured page table stored in the shared memory system.

4. The system of claim 2, wherein the first processor executes a non-secure high-level operating system, non-secure inter-processor communications associated with the non-secure high-level operating system being routed between the non-secure high-level operating system and the first memory management unit via the secure memory segmentation software layer, secure inter-processor communications associated with the secure application program being routed between the secure application program and the first memory management unit via the secure memory segmentation software layer.

5. The system of claim 1, wherein:
   the first processor is a central processing unit; and
   the second processor is a digital signal processor.

6. The system of claim 2, wherein secure inter-processor communications associated with the secure application program being routed between the secure application program and the first memory management unit via the secure memory segmentation software layer, secure inter-processor communications associated with the secure application program being broadcast across a network on the integrated circuit chip.

7. The system of claim 6, wherein the second processor executes a second secure application program, the second secure memory segmentation software layer selectively providing secure inter-processor communications received on the network to the second secure application program by determining whether a secure inter-processor communication received on the network indicates the second secure application program is an intended recipient.

8. The system of claim 1, wherein the shared memory system is a cache memory on the integrated circuit chip.

9. A method for providing security in inter-processor communication on an integrated circuit chip, comprising:
   a first processor and a second processor communicating secure inter-processor communications with each other via a shared memory system;
   wherein the first processor in communication with the shared memory system effects secure inter-processor communications and non-secure inter-processor communications using a first memory management unit to separately route the secure inter-processor communications and the non-secure inter-processor communications via the shared memory system, the first memory management unit accessing a first secure page table stored in the memory system to route the secure inter-processor communications and accessing a separate second non-secure page table stored in the memory system to route the non-secure inter-processor communications; and
   wherein the second processor in communication with the shared memory system effects at least secure inter-processor communications using a second memory management unit to route the secure inter-processor communications via the shared memory system, the second memory management unit accessing the first secure page table stored in the shared memory system to route the secure inter-processor communications, wherein the first processor executes a first secure memory segmentation software layer, a non-secure application program, and a secure application program, non-secure inter-processor communications issued by the non-secure application program being routed to the first memory management unit via the first secure memory segmentation software layer, secure inter-processor communications associated with the secure application program being routed between the secure application program and the first memory management unit via the first secure memory segmentation software layer.

10. The method of claim 9, wherein the second processor executes a second secure memory segmentation software layer.

11. The method of claim 9, wherein:
   the first processor is a central processing unit; and
   the second processor is a central processing unit, the second memory management unit further accessing the separate second non-secured page table stored in the shared memory system.

12. The method of claim 10, wherein the first processor executes a non-secure high-level operating system, non-secure inter-processor communications associated with the non-secure high-level operating system being routed between the non-secure high-level operating system and the first memory management unit via the first secure memory segmentation software layer, secure inter-processor communications associated with the secure application program being routed between the secure application program and the first memory management unit via the first secure memory segmentation software layer.

13. The method of claim 9, wherein:
the first processor is a central processing unit; and
the second processor is digital signal processor.

14. The method of claim 10, wherein secure inter-processor communications associated with the secure application program being routed between the secure application program and the first memory management unit via the first secure memory segmentation software layer, secure inter-processor communications associated with the first secure application program being broadcast across a network on the integrated circuit chip.

15. The method of claim 14, wherein the second processor executes a second secure application program, the second secure memory segmentation software layer selectively providing secure inter-processor communications received on the network to the second secure application program by determining whether a secure inter-processor communication received on the network indicates the second secure application program is an intended recipient.

16. The method of claim 9, wherein the shared memory system is a cache memory on the integrated circuit chip.

17. An integrated circuit chip, comprising:
a first processor and a second processor that communicate secure inter-processor communications with each other, each of the first processor and the second processor in communication with a shared memory system,
wherein the first processor to effect secure inter-processor communications and non-secure inter-processor communications uses a first memory management unit to separately route the secure inter-processor communications and the non-secure inter-processor communications via the shared memory system, the first memory management unit accessing a first secure page table stored in the shared memory system to route the secure inter-processor communications and accessing a separate second non-secure page table stored in the shared memory system to route the non-secure inter-processor communications; and
wherein the second processor to effect secure inter-processor communications uses a second memory management unit to route the secure inter-processor communications via the shared memory system, the second memory management unit accessing the first secured page table stored in the shared memory system to route the secure inter-processor communications, the first processor executing a first secure memory segmentation software layer, a non-secure application program, and a secure application program, such that non-secure inter-processor communications issued by the non-secure application program are routed to the first memory management unit via the first secure memory segmentation software layer, secure inter-processor communications associated with the secure application program are routed between the secure application program and the first memory management unit via the first secure memory segmentation software layer.

18. The integrated circuit chip of claim 17, wherein the second processor to communicate secure inter-processor communications comprises executing a second secure memory segmentation software layer.

19. The integrated circuit chip of claim 17, wherein:
the first processor is a central processing unit; and
the second processor is a central processing unit, the second memory management unit further accessing the separate second non-secured page table stored in the shared memory system.

20. The integrated circuit chip of claim 18, wherein the first processor executes a non-secure high-level operating system, non-secure inter-processor communications associated with the non-secure high-level operating system being routed between the non-secure high-level operating system and the first memory management unit via the secure memory segmentation software layer, secure inter-processor communications associated with the secure application program being routed between the secure application program and the first memory management unit via the secure memory segmentation software layer.

21. The integrated circuit chip of claim 17, wherein:
the first processor is a central processing unit; and
the second processor is digital signal processor.

22. The system integrated circuit chip of claim 18, wherein secure inter-processor communications associated with the first secure application program being routed between the secure application program and the first memory management unit via the first secure memory segmentation software layer, secure inter-processor communications associated with the secure application program being broadcast across a network on the integrated circuit chip.

23. The integrated circuit chip of claim 22, wherein the second processor executes a second secure application program, the second secure memory segmentation software layer selectively providing secure inter-processor communications received on the network to the second secure application program by determining whether a secure inter-processor communication received on the network indicates the second secure application program is an intended recipient.

24. The integrated circuit chip of claim 17, wherein the shared memory system is a cache memory on the integrated circuit chip.

25. A computer program product comprising a non-transitory computer readable medium having computer readable program code embodied therein, said computer readable program code comprising:
first logic configuring a first processor to effect secure inter-processor communications and non-secure inter-processor communications using a first memory management unit to separately route the secure inter-processor communications and the non-secure inter-processor communications via a shared memory system, the first memory management unit configured to access a first secure page table stored in the shared memory system to route the secure inter-processor communications and access a separate second non-secure page table stored in the shared memory system to route the non-secure inter-processor communications; and
second logic configuring a second processor to effect secure inter-processor communications and non-secure inter-processor communications using a second memory management unit to route the secure inter-processor communications and non-secure inter-processor communications via the memory system, the second memory management unit configured to access the first secure page table stored in the memory system to route the secure inter-processor communications, wherein the first logic includes a first secure memory segmentation software layer, a non-secure application program, and a secure application program, non-secure inter-processor communications issued by the non-secure application program being routed to the first memory management unit via the first secure memory segmentation software layer, secure inter-processor communications associated with the secure application program being routed between the secure application program and the first memory management unit via the first secure memory segmentation software layer.

26. The computer program product of claim 25, wherein the second logic includes a second secure memory segmentation software layer.

27. The computer program product of claim 26, wherein the first logic includes a non-secure high-level operating system, non-secure inter-processor communications associated with the non-secure high-level operating system being routed between the non-secure high-level operating system and the first memory management unit via the secure memory segmentation software layer, secure inter-processor communications associated with the secure application program being routed between the secure application program and the first memory management unit via the secure memory segmentation software layer.

28. The computer program product of claim 26, wherein secure inter-processor communications associated with the secure application program being routed between the secure application program and the first memory management unit via the first secure memory segmentation software layer, secure inter-processor communications associated with the secure application program being broadcast across a network on an integrated circuit chip.

29. The computer program product of claim 26, wherein the second logic includes a second secure application program, the second secure memory segmentation software layer selectively providing secure inter-processor communications received on a network to the second secure application program by causing the second processor to determine whether a secure inter-processor communication received on the network indicates the second secure application program is an intended recipient.

* * * * *